United States Patent [19]

Lobo et al.

[11] 4,279,386
[45] Jul. 21, 1981

[54] COMPACT PNEUMATIC REEL LATCH

[75] Inventors: Mark A. Lobo; Richard W. Pembroke, both of Tulsa, Okla.

[73] Assignee: Telex Computer Products, Inc., Tulsa, Okla.

[21] Appl. No.: 140,192

[22] Filed: Apr. 14, 1980

[51] Int. Cl.³ .............................................. B65H 17/02
[52] U.S. Cl. .................................................. 242/68.3
[58] Field of Search ...................... 242/68, 68.1, 68.2, 242/68.3, 182, 183, 184, 185

[56] References Cited

U.S. PATENT DOCUMENTS

| | | | |
|---|---|---|---|
| 3,058,686 | 10/1962 | Field | 242/68.3 |
| 3,124,319 | 3/1964 | Cohen | 242/68.3 |
| 3,272,452 | 9/1966 | Cohen | 242/68.3 |
| 3,310,253 | 3/1967 | Rayfield | 242/68.3 |
| 3,801,033 | 4/1974 | Sonderson | 242/68.3 |

*Primary Examiner*—Edward J. McCarthy
*Attorney, Agent, or Firm*—Head & Johnson

[57] ABSTRACT

An automatic, pneumatic reel latch, comprising a hub adapted to be attached to a drive shaft of a tape deck, the hub has an annular groove forming an inner cylindrical surface and an outer thin cylindrical shell. A cup-shaped piston is fitted with a rolling diaphragm and inserted into the groove. A plurality of tapered flats are molded on the outer surface of the piston. Compressed air is supplied through an axial bore in the drive shaft, into the cylinder, causing the piston to move out of the groove, and by cam action of the lands, move outwardly a plurality of roller friction pad assemblies, having friction pads on their outer surfaces. A tape reel is adapted to slide over the latch and to be outside of, and co-planar with, the friction pads. The pneumatic pressure of the piston will force the friction pads into contact with the reel, providing sufficient friction to drive the reel in synchronism with the hub.

2 Claims, 6 Drawing Figures

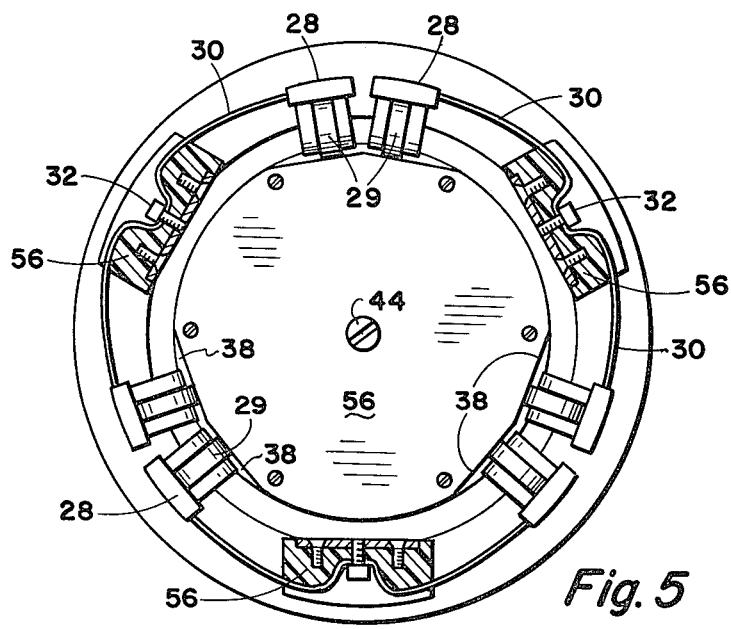
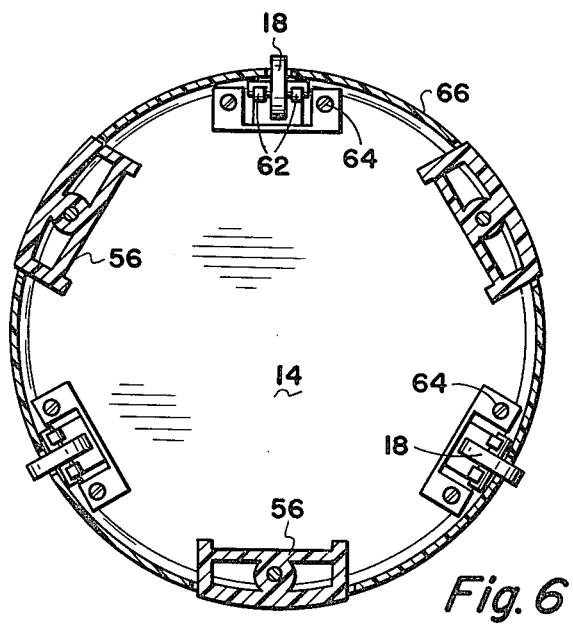

COMPACT PNEUMATIC REEL LATCH

BACKGROUND OF THE INVENTION

1. Field of the Invention

This invention lies in the field of magnetic tape decks for writing and reading of digital data on and from magnetic tapes. More particularly, it concerns the design of an automatic tape reel latch, which permits quick and easy positioning of the tape reel over the latch, and by pneumatic pressure, provides a strong force applying friction to the reel, in order to drive it at high accelerations.

2. Description of the Prior Art

In the prior art there are a number of different designs of tape reel latches, on which tape reels can be mounted for rotation by a drive shaft of a tape deck. Most of these are of a strictly mechanical design in which a manually operated cam means forces outwardly a plurality of circumferentially spaced friction pads to grip the inner surface of the tape reel and to drive it in synchronism with the rotation of the reel latch and shaft. These mechanical latches have limited range of the cams which can be provided for mechanical control, and because as the friction pads wear, there is no way to adjust, and the friction pressure is reduced. Thus, these prior art latches have not been entirely satisfactory. In the present system, a reel latch which is operated by pneumatic pressure has a greater range of cam action and applies a selected frictional force, which locks the reel to the hub, and to the drive shaft.

SUMMARY OF THE INVENTION

It is a primary objective of this invention to provide a simple, automatic pneumatic reel latch which provides sufficient power to ensure frictional contact between the hub and the tape reel for all types of tape drives.

It is further object of this invention to provide a tape reel latch that is operated automatically as soon as the operator initiates the automatic threading of the tape through the tape deck.

It is a still further object of this invention to provide a reel latch in which the friction pads can be removed and replaced without dismantling the reel latch, or removing it from the drive shaft.

These and other objects are realized and the limitations of the prior art are overcome in this invention by providing a hub with an axial opening, which is adapted to receive the drive shaft, and provides means for rigidly clamping the hub to the drive shaft. The hub is designed with a central cylindrical portion, a flange at the back end of the hub, and an outer cylindrical shell. These parts form an annular groove, or channel, in the hub into which a cup-like piston is loosely fitted over the central cylindrical portion. A rolling diaphragm is provided between the outer cylindrical shell of the hub and the outer surface of the piston, so that compressed air can be fed into the piston through an axial opening in the drive shaft. This air pressure on the piston forces it longitudinally out of the annular groove toward the front of the reel latch.

A plurality of circumferentially spaced sloping flat lands, or cams, are molded on the outer surface of the piston.

A flange is provided on the outer surface of the outer cylindrical shell of the hub which forms a backstop against which a tape reel is pressed when it is positioned over the reel latch.

Co-planar with the position of the tape reel when it is in position around the reel latch, are a plurality of circumferentially spaced roller friction pad assemblies, each of which includes an outer friction pad, and an inner roller which is adapted to run on one of the machined lands. Thus, as air pressure is applied inside the piston causing it to move to the front, the sloping lands act as cams to centralize the friction pads and to move them outwardly, radially, so as to engage the inner cylindrical surface of the tape reel, with a pressure which is a function of the pressure of the air driving the piston.

A cover is provided over the front of the tape reel latch which includes a plurality of circumferentially spaced rollers which are spring supported so as to be urged radially outwardly. These multiple rollers tend to hold the tape reel against the flange while pressure is introduced to the cylinder causing latching action. Then when air pressure is applied to the piston through an axial opening in the drive shaft, it causes the piston to move out of the annular groove in the hub, and to engage the rollers on the friction pad assemblies, to lock the tape reel to the reel latch.

The friction pad assemblies, or roller/friction pad assemblies are mounted as subassemblies onto metal springs which are held by screws at their mid positions, to a plurality of posts extending longitudinally from the hub. These springs are stiff enough so that they maintain the circumferential position of the friction pads but permit the pads to move radially outwardly, over a limited range, as the piston moves outwardly, and the sloping lands contact the rollers. As the friction pads wear the pneumatic reel latch adjusts for this by moving the piston out farther, until a selected force is applied to the reel hub. When the pads need replacement, they can be replaced very simply by removing two screws which are readily available without disassembling the latch, and a new one can be placed in position in a matter of seconds.

BRIEF DESCRIPTION OF THE DRAWINGS

These and other objects and advantages of this invention and a better understanding of the principles and details of the invention will be evident from the following description taken in conjunction with the appended drawings in which:

FIG. 2 illustrates the condition where the piston is in retracted position, and FIG. 3 illustrates the condition where the piston is in extended position.

FIG. 5 is a cross-section perpendicular to the axis taken across the plane 5—5 of FIG. 3.

FIG. 6 is a cross-section taken along the plane 6—6 of FIG. 3.

DETAILED DESCRIPTION OF THE PREFERRED EMBODIMENT

Figure 1:
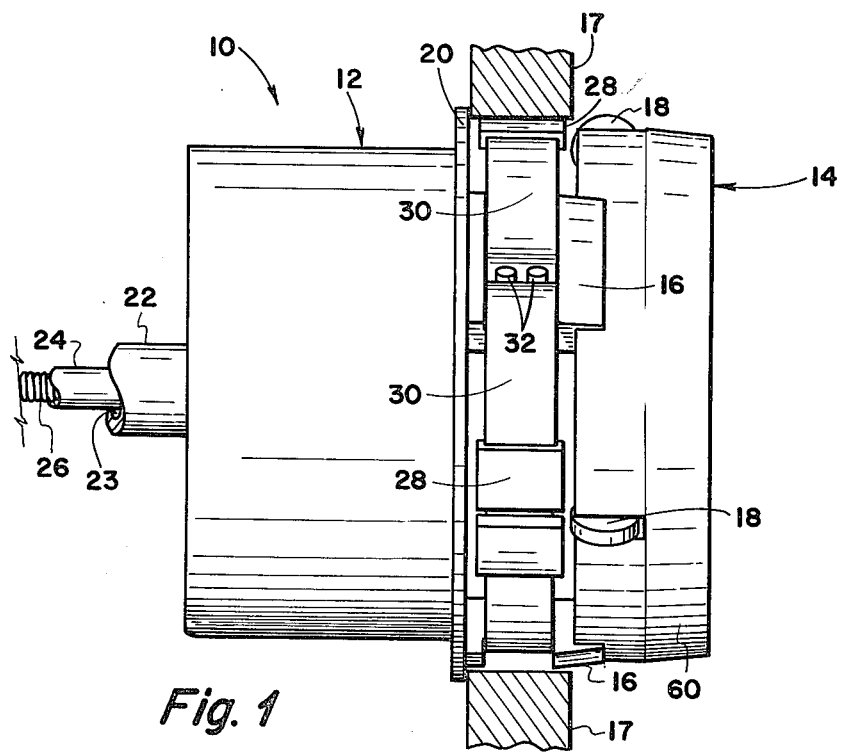
FIG. 1 is a side view of the reel latch of this invention.
Figure 2:
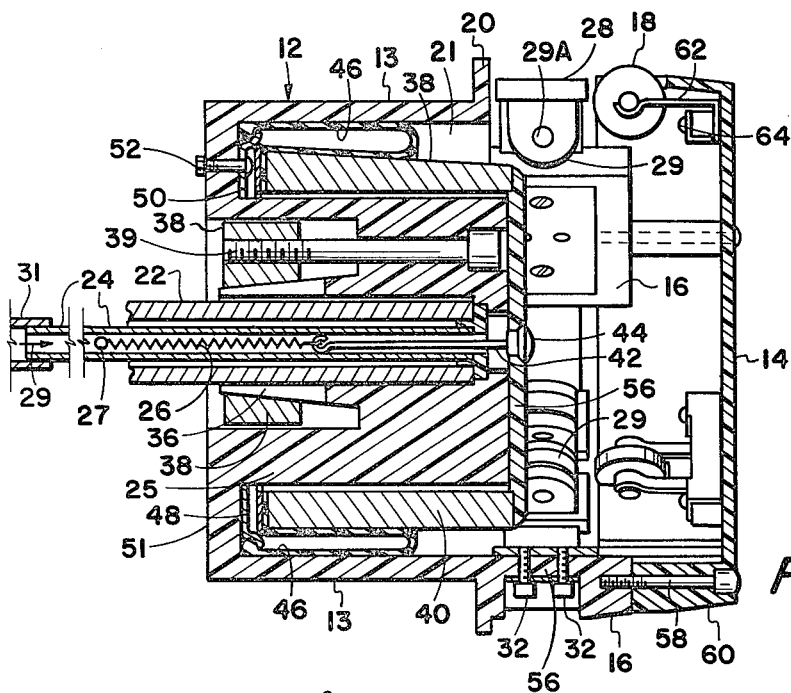
FIGS. 2 and 3 are similar axial cross-sections.
Figure 3:
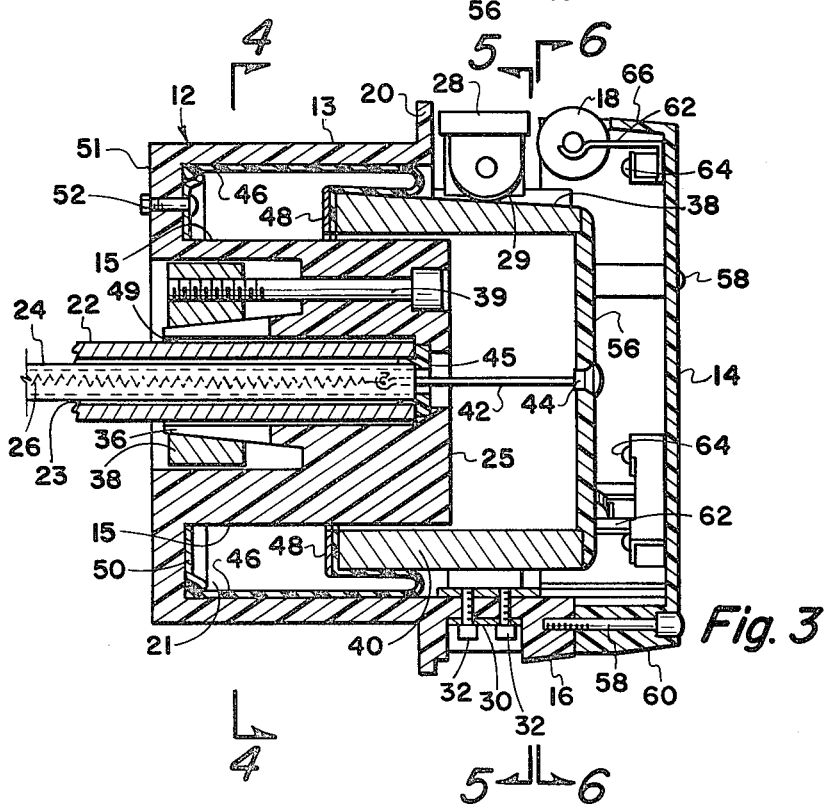

Referring now to the drawings and, in particular, to FIGS. 1, 2, and 3, there is shown an exterior view of one embodiment of this invention, indicated generally by the numeral 10. It comprises a cylindrical hub indicated generally by the numeral 12 which is supported by a drive shaft 22 which is a part of the tape deck. The drive shaft 22 has an internal axial bore 23 into which is fitted a small thin-walled metal tube 24 through which compressed air can be supplied from the back of the tape deck by a plenum feed around tube 31 in accordance with arrow 29. Also an elastic member, such as a helical spring 26 is anchored back of the latch 10, as will be described in connection with FIGS. 2 and 3.

The hub 12 carries an outward flange 20 which serves as a backstop against which a tape reel, indicated by the numeral 17, is placed over the reel latch and against the flange 20 to be in the proper position for the threading of the tape through the tape deck.

In its proper position, surrounding the reel latch, the inner wall of the tape reel 17 rests on a plurality of circumferentially spaced friction pads 28 which are supported in their circumferential and axial positions by broad strap springs 30 which are anchored by screws 32, to projecting parts of the hub, as will be more clearly described in FIGS. 2 and 3.

The front portion of the reel latch has a cover indicated generally by the numeral 14 which provides a concentric tapered structure to assist in the centering of the tape reel over the latch. The sloping surface 16 provides a further tapered portion. There are a plurality of rollers 18 positioned symmetrically around the circumference. These are held in position by spring clips 62 so that they further center the reel hub as it is pushed over the front portion of the reel latch and over the friction pads 28 to its final position against the flange 20.

Referring now to FIGS. 2 and 3, there are similar cross-sectional views of the reel latch, taken in a diametral plane. The hub 12 has a central cylindrical portion 25 which has an axial bore 49 suitable for the insertion of the drive shaft 22 which projects from the rear of the tape deck, not shown, to support the hub of the reel latch. There are tapered tongues 36 in the internal surface of the hub, which can be squeezed inwardly by the wedge-shaped fixture 38 which can be moved longitudinally by means of screws 39, to positively lock the central hub to the drive shaft 22.

Inside of the hollow shaft 22 is a metal tube 24, which is coaxial with the shaft and is provided at its rear, or distal end, by means such as tube 31 to supply air under pressure, in accordance with the arrow 29, down around the tube 24 into the hub. The near or proximal end of the tube, and of the drive shaft, is sealed by a suitable means 45, so that air pressure inside of the shaft 22 will serve to press forward the piston 40, which will now be described.

The hub 12 has an internal cylindrical portion 25, back flange 51 which supports an outer cylindrical shell 13 which again supports the centering flange 20. Between the inner cylinder 25 and the outer shell 13 is a cylindrical annular space or groove, into which is loosely fitted a cylindrical cup which operates as a piston and is adapted to slide inwardly and outwardly in this annular groove or channel. The space between the piston and the outer cylindrical shell is sealed by means of a conventional rolling diaphragm of rubber or other suitable material, as is well known in the art.

As pressurized air is provided through the tube 31 and into the shaft 22, and into the interior of the piston 40 (having a front plate 56), the pneumatic pressure forces the piston to the right, or out of the groove, as shown in FIG. 3. The piston is restrained in moving out of the groove by means of a helical spring 26 inside of the tube 24. The distal end of this spring is anchored at a point 27 behind the hub, and the proximal end is attached to a hook on a rod anchored to the front surface 56 of the piston. The rod 42 is threaded and is locked by a nut 44. Thus, when the piston moves out of the groove the spring is extended and when the air pressure is removed, the spring retracts the piston back into the groove.

There are a plurality of flats which are molded on the outer surface of the piston in a circumferentially spaced pattern, shown clearly in FIG. 5. These flats or lands are tapered, as shown in FIGS. 2 and 3, so that as the piston moves outwardly, the radius of the flats increases. They therefore act as cams or wedges, and in conjunction with rollers 29 which are supported on shafts 29A in an assembly 28 called a pressure pad assembly or a roller/pressure pad assembly. As the piston moves to the right and engages the rollers 29, the pressure pad will move upwardly as it rides along the lands 38.

The circumferential position of these lands and of the rollers 29 and pressure pad assemblies 28, is more clearly shown in FIG. 5. While three pairs of friction pads have been shown and are considered sufficient, any number could, of course, be used as desired.

With further attention to FIG. 5, the pressure pads 28 are attached to shaped flat springs 30 which are anchored by means of screws 32 to three posts 56 around the circumference, extending longitudinally from the front end of the hub. This is clearly shown in FIGS. 1, 2, 3 and 5. Thus, as shown in FIG. 1, by removing the two screws 32, one spring 30 having a pressure pad at each end can be removed outwardly and be replaced with other spring and pad assemblies and locked again by the screws 32, without even removing the decal and taking off the cover of the reel latch.

The springs 30 are of considerable width, and thus prevent the rotation of the friction pads 28, controlling them in a circumferential position, but allowing freedom for movement in a radial direction, as the piston moves outwardly and as the lands press cam-wise on the rollers 29.

In the present art, there is a standardized design and construction of the tape reels, and there is a common design of the tape threading mechanism by which a tape reel when put in position on the tape deck, and the provision of compressed air through the tape mechanism, will cause the tape reel to be unwound and threaded through the tape deck and attached to the take-up reel, etc. in a fully automatic operation. The details of the tape deck and the tape threading mechanism are well known and need not be described further, particularly since they form no part of this invention. The only point to make is that the compressed air that threads the tape also latches the reel to the hub, as previously described.

FIG. 5 is a transverse section taken along plane 5—5 of FIG. 3, and clearly shows the hub parts 56 that support the springs 30, that support the friction pad assemblies 28 with their rollers 29. The end view 56 of the piston clearly shows the lands 38.

FIG. 6 is a transverse section taken along plane 6—6 of FIG. 3 and shows the hub parts 56, the centering rollers 18 and the spring arms 62 which hold them in position. The spring assemblies are held to the cover by screws 64.

Figure 4:
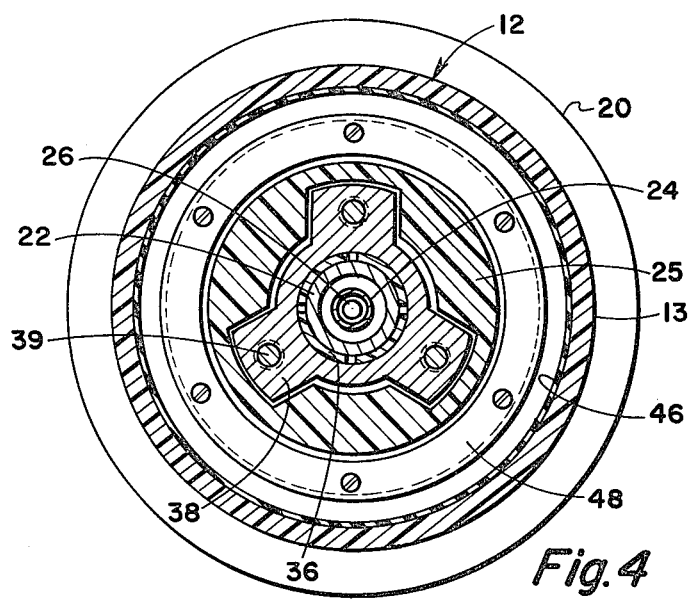
FIG. 4 is a cross-section of the reel latch taken across the plane 4—4 of FIG. 3.

FIG. 4 is a transverse section taken along the plane 4—4 of FIG. 3. This clearly shows the clamping fixture 38, held by screws 39 which locks the hub tips 36 to the drive shaft. Outside of the hub cylinder 25 is the piston, showing a metal ring 48 which locks one end of the rolling diaphragm 46 to the piston. The other end is locked to the hub flange 51 by the metal ring 50, attached by fastenings 52. The outer shell 13 of the hub is shown and the positioning flange 20.

In review, tape decks or transports, used in data processing require means of attaching reels of tape to the drive mechanism. Industry standard tape reels are secured to the drive mechanism by latching devices that transmit torque by friction only. Due to demands of compact, high performance, operator efficient machines, a reel latch is required that is small, powerful, and automatically actuated. Existing designs typically address a limited combination of these factors, while the invention which has been described satisfies all requirements.

Operation begins by the operator placing a reel of tape over the latch and flush against the mounting flange. The reel of tape is held in this position by outward pressure of three retaining wheels. The operator initiates the autoload sequence, and air pressure is applied to the latch through the center of the drive shaft, causing the piston to move along the axis of the drive shaft. The outside diameter of the piston is interrupted by three pair of flat cam lands. These cam lands force friction pads against the tape reel through low friction follower assemblies.

The piston does not require rigid guidance due to the inherent stability achieved by the cam land arrangement. In the event of eccentric loading during the latching action, the cam lands subject to the higher loads change slope with respect to the axis of the latch, increase mechanical gain, and allow the other friction followers to retard the pitching action.

The friction follower assemblies are attached to spring arms made from stiff material that resist rotation around axes parallel to the friction follower bearing axis. The formed curvature of each spring arm is such that when deflected by the cam action, the friction follower bearing surface is in full contact with the cam land, thus eliminating uneven cam loading. Drive torque is transmitted from the hub to the spring arms through a clamping arrangement. This allows easy removal of these assemblies without disassembly of the entire reel latch, for replacement of the friction pads.

A preloaded spring cartridge returns the piston to its rest position when the reel of tape is unloaded. The spring cartridge is attached to the reel latch by a clamping pressure. This clamping pressure is generated by a slight extension of the return spring beyond its rest position as the rod nut draws the rod end against the cam cover during assembly. When incorporated on a machine, this spring cartridge extends through the hollow drive shaft with no interference.

While this invention has been described with a certain degree of particularity, it is manifest that many changes may be made in the details of construction and the arrangement of components without departing from the sprit and scope of this disclosure. It is understood that the invention is not limited to the embodiments set forth herein for purposes of exemplification, but is to be limited only by the scope of the attached claim or claims, including the full range of equivalency to which each element there of is entitled.

What is claimed is:

1. A compact pneumatic reel latch for a magnetic tape deck having a drive shaft, said drive shaft having an axial opening therethrough, and means to supply pressurized air through said opening, comprising;
    (a) a cylindrical hub, and means to clamp said hub to said drive shaft;
    (b) an annular groove cut into the proximal end of said hub, forming an inner cylindrical surface and an outer cylindrical shell;
    (c) a cuplike piston adapted to fit loosely inside of said annular groove, and rolling diaphragm means to seal between the outer surface of said piston and the inner surface of said cylindrical shell;
    (d) means to apply pressurized air to the inside of said piston through said axial opening, thereby said piston will move axially out of said groove;
    (e) elongatable elastic means inside said axial opening, the distal end of said elastic means anchored behind said hub, the proximal end attached to the inside of said piston;
    whereby said piston is withdrawn back into said groove by said elastic means when said pressurized air is removed from the inside of said piston;
    (f) a plurality of circumferentially spaced sloping flat lands provided on the outer surface of said piston;
    (g) a plurality of circumferentially spaced first roller/friction pad means, supported by circumferential spring means; each of said roller/friction pad means running on one of said sloping lands;
    whereby when said piston is moved out of said annular groove by said pressurized air, each of said circumferentially spaced roller/friction pad means, running on said sloping lands, will move radially outwardly;
    whereby, when a tape reel hub is positioned over said plurality of roller/friction pad means, said roller/friction pad means will press on the inside surface of said reel hub causing it to rotate with said hub.

2. The reel latch as in claim 1 and including a plurality of circumferentially spaced second roller means positioned in radial planes for guiding said reel hub over said first roller means.

* * * * *